United States Patent
Scharfenberger et al.

(10) Patent No.: US 12,530,906 B2
(45) Date of Patent: Jan. 20, 2026

(54) SYSTEM FOR AVOIDING ACCIDENTS CAUSED BY WILD ANIMALS CROSSING AT DUSK AND AT NIGHT

(71) Applicant: Continental Autonomous Mobility Germany GmbH, Ingolstadt (DE)

(72) Inventors: Christian Scharfenberger, Lindau (DE); Michelle Karg, Lindau (DE)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 250 days.

(21) Appl. No.: 18/250,201

(22) PCT Filed: Oct. 19, 2021

(86) PCT No.: PCT/DE2021/200153
§ 371 (c)(1),
(2) Date: Apr. 21, 2023

(87) PCT Pub. No.: WO2022/083833
PCT Pub. Date: Apr. 28, 2022

(65) Prior Publication Data
US 2023/0394844 A1    Dec. 7, 2023

(30) Foreign Application Priority Data
Oct. 21, 2020   (DE) ............. 10 2020 213 270.4

(51) Int. Cl.
*G06V 20/58*    (2022.01)
*G06V 10/14*    (2022.01)
(Continued)

(52) U.S. Cl.
CPC ............. *G06V 20/58* (2022.01); *G06V 10/14* (2022.01); *G06V 10/60* (2022.01); *G06V 10/82* (2022.01)

(58) Field of Classification Search
CPC ........ G06V 20/58; G06V 10/14; G06V 10/60; G06V 10/82; G06F 18/2414
See application file for complete search history.

(56) References Cited

U.S. PATENT DOCUMENTS

2009/0295920 A1   12/2009   Simon
2010/0246940 A1    9/2010   Lin
(Continued)

FOREIGN PATENT DOCUMENTS

CN    103477347 A    12/2013
CN    107316002 A    11/2017
(Continued)

OTHER PUBLICATIONS

Kim et al, Convolutional Neural Network-Based Human Detection in Nighttime Images Using Visible Light Camera Sensors, 2017, Sensors, 17, 1065: 1-26. (Year: 2017).*
(Continued)

*Primary Examiner* — Kathleen M Broughton
(74) *Attorney, Agent, or Firm* — Buchanan Ingersoll & Rooney PC

(57) ABSTRACT

There is disclosed a method and a device for avoiding accidents caused by wild animals crossing at dusk and at night by a vehicle-mounted camera system. The method for the brightness conversion of input image data of the camera into output image data includes the following steps: a) capturing input image data of a current brightness of a roadway and an adjacent region to the side of the roadway by f a vehicle-mounted camera system at dusk or at night, b) converting the input image data into output image data with a different brightness by a trained artificial neural network, and c) outputting the output image data so that the output image data can be displayed to the driver of the vehicle for the purpose of avoiding accidents involving wild animals or
(Continued)

so that a wild animal can be recognized from the output image data by an image recognition function.

14 Claims, 4 Drawing Sheets

(51) Int. Cl.
*G06V 10/60* (2022.01)
*G06V 10/82* (2022.01)

(56) References Cited

U.S. PATENT DOCUMENTS

| | | | |
|---|---|---|---|
| 2014/0085473 | A1 | 3/2014 | Donishi |
| 2014/0112532 | A1 | 4/2014 | Faber et al. |
| 2019/0087944 | A1 | 3/2019 | Chakraborty et al. |
| 2019/0289282 | A1* | 9/2019 | Briggs ............... H04N 23/71 |
| 2020/0167972 | A1* | 5/2020 | Birnhack ............ G06N 3/045 |

FOREIGN PATENT DOCUMENTS

| | | | | |
|---|---|---|---|---|
| DE | 102004050597 | A1 | 4/2006 | |
| DE | 102004050990 | A1 | 4/2006 | |
| DE | 102013011844 | A1 | 2/2015 | |
| DE | 102016215707 | A1 * | 2/2018 | ........... A01M 29/10 |
| DE | 102018201054 | A1 | 8/2018 | |
| DE | 10 2018 114 231 | A1 | 12/2019 | |
| EP | 2843937 | A1 | 3/2015 | |
| EP | 3073465 | A1 | 9/2016 | |
| JP | 2010-231756 | A | 10/2010 | |
| KR | 10-2019-0017383 | A | 2/2019 | |
| KR | 10-2109841 | B1 | 5/2020 | |

OTHER PUBLICATIONS

Shi et al, Research on Image Adaptive Enhancement Algorithm under Low Light in License Plate Recognition System, 2020, Symmetry, 12, 1552, 1-18. (Year: 2020).*

Munian et al, Intelligent System for Detection of Wild Animals Using HOG and CNN in Automobile Applications, 2020, 11th International Conference on Information, Intelligence, Systems and Applications, pp. 1-9. (Year: 2020).*
Zheng et al , A local-coloring method for night-vision colorization utilizing image analysis and fusion, 2007, Information Fusion 9 (2008) 186-199. (Year: 2007).*
Mahmood et al, A treatise to vision enhancement and color fusion techniques in night vision devices, 2017, Multimed Tools Appl (2018) 77: 2689-2737. (Year: 2017).*
Forslund et al, Night vision animal detection, 2014, IEEE Intelligent Vehicles Symposium Proceedings, pp. 1-7. (Year: 2014).*
Saleh et al, Effective Vehicle-based Kangaroo Detection for Collision Warning Systems Using Region-based Convolutional Networks, 2018, Sensors 18 (1913: 1-15 (Year: 2018).*
German Search Report dated Mar. 30, 2021 for the counterpart German Patent Application No. 10 2020 213 270.4.
The International Search Report and the Written Opinion of the International Searching Authority mailed on Feb. 10, 2022 for the counterpart PCT Application No. PCT/DE2021/200153.
Qingxu Fu et al., "Learning an Adaptive Model for Extreme Low-light Raw Image Processing", Olin Library, Cornell University, arXiv:-2004.10447v1 (eess.IV) Apr. 22, 2020.
See Woon Cho et al., "Semantic Segmentation With Low Light Images by Modified CycleGAN-Based Image Enhancemend", Harbin Institute of Technology, pp. 1-11, Published in: IEEE Access ( vol. 8), pp. 93561-93585, Date of Publication: May 15, 2020.
Wenhan Yang et al., "Advancing Image Understanding in Poor Visibility Environments: A Collective Benchmark Study", Published in: IEEE Transactions on Image Processing ( vol. 29), pp. 5737-5752, DOI: 10.1109/TIP.2020.2981922, Mar. 27, 2020.
Office Action (Request for the Submission of an Opinion) issued Aug. 25, 2025, by the Korean Intellectual Property Office in corresponding Korean Patent Application No. 10-2023-7008786 and an English translation with the Concise Statement of Relevance of the Office Action. (16 pages).
Office Action (The First Office Action) issued Oct. 23, 2025, by the State Intellectual Property Office of People's Republic of China in corresponding Chinese Patent Application No. 202180067290.X and an English translation of the Office Action. (18 pages).

* cited by examiner

SYSTEM FOR AVOIDING ACCIDENTS CAUSED BY WILD ANIMALS CROSSING AT DUSK AND AT NIGHT

CROSS-REFERENCE TO RELATED APPLICATIONS

The present application is a National Stage Application under 35 U.S.C. § 371 of International Patent Application No. PCT/DE2021/200153 filed on Oct. 19, 2021, and claims priority from German Patent Application No. 10 2020 213 270.4 filed on Oct. 21, 2020, in the German Patent and Trademark Office, the disclosures of which are herein incorporated by reference in their entireties.

TECHNICAL FIELD

The invention relates to a method and a device for avoiding accidents caused by wild animals crossing at dusk and at night by means of a vehicle-mounted camera system.

Today's vehicles are equipped with camera-based driver assistance systems which monitor the regions in front of, next to or behind the vehicle. This either serves to recognize objects in order to avoid collisions, to recognize road boundaries or to stop the vehicle within the lane.

BACKGROUND

These systems work with high-resolution cameras which today have an ever higher dynamic range. In particular, display and recognition functions benefit from the latter in situations with different brightness levels and contrast.

The recognition algorithms based on these camera systems already partially combine approaches of classical image processing with approaches from machine learning, in particular deep learning. Classical approaches to recognizing objects or structures as part of the image processing are based on manually selected features, while approaches based on deep learning determine and optimize relevant features in the training method itself.

Recently, the focus of object recognition has expanded to include the recognition of animals and wild animals crossing the roadway. Thus, DE 102004050597 A1 shows, for example, a wild animal crossing warning device and methods for warning about animate objects on a public highway.

The recognition primarily serves to avoid damage caused by colliding with wild animals, especially at dusk or at night. The cameras used for this typically have a viewing range directed at the road, so that animals located predominantly on the road such as deer are to be recognized. These systems are supported by the vehicle lamps at dusk or at night, which can illuminate the road region sufficiently.

The systems used exhibit a very good performance in scenarios which are adequately illuminated by daylight, road lighting or the beam of a vehicle's headlights. Animals located on the road can be recognized relatively well at dusk or at night. However, these camera systems experience the following problems:

1) Due to the camera's narrow field of view, only animals on the roadway can be recognized. However, in the event of wild animals suddenly crossing the roadway, these animals can run onto the road, unseen, very close in front of the vehicle and suddenly appear in the viewing range. Consequently, it is only possible to react by braking, for instance, with great difficulty, and a collision can occur.

2) This problem is exacerbated at dusk or at night on an unlit country road where animals approaching the road are very difficult for a driver to see or are not seen at all by the driver due to the lack of light, and then suddenly appear in the beam of the headlights when it is already too late.

Given the requirements which will in future be imposed on environment recognition and driver assistance systems, wide-angle cameras will be increasingly deployed, as they will make it possible for an intersection assistant to recognize intersecting traffic. The wide-angle cameras can monitor both the road and a large region next to the road, and would therefore be very suited to recognizing wild animals crossing.

EP 3073465 A1 shows an animal detection system for a vehicle which is based on a panoramic view camera system and a localization system.

However, there is a deterioration in both the recognition of objects such as wild animals and the representation of the surroundings as soon as there is only little to no ambient light at all in order to illuminate the scenario in a situation. This is the case when vehicle lamps only illuminate the region of the road, but not the regions next to the road. At night, current lighting and camera systems only provide insufficient support.

This could be remedied by additional lamps installed on the sides of the vehicle, which illuminate critical regions in front of and next to the vehicle. For complete illumination, however, a large number of lamps is necessary, which, in addition to disagreeable design restrictions, would also lead to considerable additional costs.

Furthermore, camera images can be brightened and enhanced by algorithmic methods such as gamma correction, auto white balance or histogram equalization. However, the latter show significant performance losses due to the lack of color information in the image, especially in the dark. A further challenge is the unevenly illuminated image regions, in which some are very bright and others are very dark. A global or local brightening of the image would brighten the already sufficiently lit region too much, or would only brighten darker regions insufficiently. This can lead to artifacts which are critical for a recognition function and lead to "false positives" or "false negatives," for example.

Summary

A system would therefore be desirable which algorithmically makes possible a good upgrading of the unilluminated regions without additional lighting and makes possible a function for recognizing wild animals crossing at dusk or at night early on.

It is an object of the present disclosure to provide solutions for this.

The object is addressed by the subject-matter of the independent claims. Advantageous embodiments are the subject-matter of the dependent claims, the following description as well as the figures.

A method for avoiding accidents caused by wild animals crossing at dusk and at night includes the following steps:
a) capturing input image data of a current brightness of a roadway and an adjacent region to the side of the roadway by means of a vehicle-mounted camera system at dusk or at night,
b) converting the input image data into output image data with a different brightness by means of a trained artificial neural network, and c) outputting the output image data so that the output image data can be displayed to the driver of the vehicle for the purpose of avoiding accidents involving wild animals or so that a wild animal can be recognized from the output image data by means of an image recognition function.

An example of a vehicle-mounted camera system is a wide-angle camera arranged behind the windshield in the interior of the vehicle, which can capture and image the region of the vehicle's surroundings in front of the vehicle and to the side in front of the vehicle through the windshield.

The wide-angle camera comprises a wide-angle lens. For example, the wide-angle lens is configured with a horizontal (and/or vertical) viewing angle of, e.g., at least +/−50 degrees, in particular of at least +/−70 degrees and/or of +/−100 degrees to the optical axis. For example, a peripheral environment such as, e.g., a region to the side of the roadway on which the vehicle is driving or an intersection region for early object recognition of animals or intersecting road users can be captured by means of the wide-angle lens. The viewing angles determine the field of view (FOV) of the camera device.

Alternatively or cumulatively, the vehicle-mounted camera system can comprise a panoramic view camera system having a multiplicity of vehicle cameras. For example, the panoramic view camera system can have four vehicle cameras, one of which can look forward, one backward, one to the left and one to the right.

Advantages of the method are:
Avoidance of damage to the vehicle by accidents involving wild animals;
Avoidance of consequential damage by another vehicle driving into the back of the ego vehicle which has to brake hard due to wild animals crossing;
Significant enhancement in image quality when displaying night images;
No additional lighting is required, which brightens vehicle regions such as the side regions having missing lighting; This can be a unique selling point for ADAS.
Generating an image data stream for Human and Computer Vision from a network for recognizing intersecting wild animals for the purpose of avoiding accidents.

The training (or machine learning) of the artificial neural network can take place with a plurality of pairs of training images in such a way that an image with a first brightness or brightness distribution and, as a target output image, an image of the same scene with a different second brightness or brightness distribution are in each case provided at the input of the artificial neural network. The term "brightness conversion" can also include a color conversion and contrast enhancement so that a "vision enhancement" which is as comprehensive as possible is attained. A color conversion can take place, for example, by adapting the color distribution. The artificial neural network can, for example, be a convolutional neural network (CNN).

Pairs of training images can be produced by acquiring, in each case, a first image with a first brightness and a second image with a second brightness simultaneously or immediately following one another with different exposure times. A first shorter exposure time leads to a darker training image and a second longer exposure time leads to a brighter training image. For example, the camera is stationary (motionless) with respect to the surroundings to be captured during the production of the training data. To this end, the training data can be captured, for example, with a camera of a stationary vehicle. The scene captured by the camera can, for example, include static surroundings, i.e., without moving objects.

At least one factor d can be established as a measure of the difference between the second and the first brightness of a pair of training images and can be provided to the artificial neural network as part of the training.

The factor d can, for example, be established as the ratio of the second brightness to the first brightness. The brightness can be established, in particular, as the mean brightness of an image or on the basis of an illuminance histogram of an image.

In one embodiment, the conversion brings about a compensation or a balance of the illumination of the region to the side of the roadway and the roadway region.

In one embodiment, the artificial neural network has a joint input interface for two separate output interfaces. The joint input interface has shared feature representation layers. Brightness-converted image data are output at the first output interface. ADAS-relevant detections of at least one ADAS detection function are output at the second output interface. ADAS stands for Advanced Driver Assistance Systems. Consequently, ADAS-relevant detections are, e.g., objects, articles, animals and road users which represent important input variables for ADAS/AD systems. The artificial neural network comprises ADAS detection functions, e.g., object recognition, wild animal recognition, lane recognition, depth recognition (3D estimation of the image components), semantic recognition, or the like. As part of the training, the outputs of both output interfaces are optimized.

The output image data, which are optimized in their brightness, advantageously make possible better machine object and/or animal recognition in the output image data, e.g., conventional animal/object/lane or traffic sign detection.

In one embodiment, in step a), a factor d is additionally provided to the trained artificial neural network and, in step b), the (strength or the degree of) conversion is controlled as a function of the factor d. Based on the factor d, the degree of strengthening can be regulated.

According to one embodiment, the conversion in step b) takes place in such a way that a vision enhancement in terms of overexposure is attained. For example, as part of the training, it was learnt that the brightness of overexposed images should be reduced.

In one embodiment, the input image data with current brightness are converted into original image data with a longer (virtual) exposure time in step b). This offers the advantage of avoiding motion blur.

According to one embodiment, the factor d is estimated, and the brightness of the current, captured image data (e.g., illuminance histogram or mean brightness) or of the previously captured image data is taken into account during the estimation.

Too high a brightness is indicative, for example, of an overexposure, whilst too low a brightness is indicative of underexposure. Both can be ascertained by means of corresponding threshold values and remedied by a corresponding conversion.

In one embodiment, following a recognition that at least two image regions of a currently captured image have a (significantly) different image brightness, a different factor d is estimated or determined for each of the image regions. In the presence of image regions having different lighting intensities, the factor d can consequently vary within an image and image regions having different factors d are determined via brightness estimates. Consequently, the brightness enhancement can be adapted to individual image regions.

According to one embodiment, a temporal development of the factor d can be taken into account when determining or estimating the factor d.

To this end, the temporal development of the factor d and a sequence of input images are incorporated into the estimation. Information regarding the temporal development of the brightness can also be enlisted for image regions having different factors d.

To this end, according to one embodiment, a separate factor d can be estimated or determined for each of the vehicle cameras (2-i).

According to one embodiment having a vehicle-mounted environment detection camera, information regarding the current surroundings of the vehicle is taken into account when determining the factor d.

The estimation of the factor d can take into account further scene information, such as information about the surroundings (country road, town, highway, tunnel, underpass), which is obtained via image processing from the sensor data or data of a navigation system (e.g., GPS receiver having a digital map).

For example, the factor d can be estimated, based on information regarding the surroundings, and from the chronological order of images as well as from the history of the factor d.

The factor d can consequently be estimated dynamically when deploying a trained artificial neural network.

In one embodiment, the converted image data of the camera system are output to at least one ADAS detection function which establishes and outputs ADAS-relevant detections. ADAS detection functions can comprise known edge or pattern recognition methods as well as recognition methods which can recognize and optionally classify relevant image objects such as, e.g., wild animals by means of an artificial neural network.

In one alternative embodiment, the approach can be extended and the artificial neural network for brightness conversion of the image data can be combined with a neural network for ADAS detection functions, e.g., lane recognition, object recognition, depth recognition, semantic recognition. Consequently, hardly any additional outlay in computing time is caused. Following the training, the (first) output interface for outputting the converted image data can be eliminated, so that only the (second) output interface is available for the ADAS detections during deployment in the vehicle.

Furthermore, the present disclosure relates to a device having at least one data processing unit configured for brightness conversion of input image data of a camera into output image data. The device includes: an input interface, a trained artificial neural network and a (first) output interface.

The input interface is configured to receive input image data of a current brightness, which have been captured by the camera. The trained artificial neural network is configured to convert the input image data, which have a first brightness, into output image data with different output brightness.

The (first) output interface is configured to output the converted image data.

In other words, the device (or the assistance system) comprises at least one camera system which can monitor the road and the regions next to the road. Despite the fact that it is dark, the lighting is very unbalanced and the lack of color information, the assistance system algorithmically converts the image data of the underlying camera system into a representation which corresponds to a photograph taken in full illumination or daylight. The converted image is then used either for purely display purposes or as an input for CNN or feature-based recognition algorithms for recognizing wild animals crossing.

The device or the data processing unit can in particular comprise a microcontroller or processor, a Central Processing Unit (CPU), a Graphical Processing Unit (GPU), a Digital Signal Processor (DSP), an ASIC (Application Specific Integrated Circuit), a FPGA (Field Programmable Gate Array) and the like as well as software for performing the corresponding method steps.

According to one embodiment, the data processing unit is implemented in a hardware-based image preprocessing stage (Image Signal Processor (ISP)).

In one embodiment, the trained artificial neural network for brightness conversion is a component of a vehicle's ADAS detection neural network, e.g., for semantic segmentation, lane detection or object detection, having a shared input interface (input or feature representation layers), and two separate output interfaces (original layers), wherein the first output interface is configured to output the converted output image data and the second output interface is configured to output the ADAS detections (image recognition data).

The present disclosure furthermore relates to a computer program element which, when a data processing unit is programmed therewith, instructs the data processing unit to perform a method for the brightness conversion of input image data of a camera into output image data.

The present disclosure furthermore relates to a computer-readable storage medium on which such a program element is stored.

A further aspect relates to the use of a method for machine learning a brightness conversion of input image data of a camera into output image data in order to train an artificial neural network of a device having at least one data processing unit.

The present disclosure can consequently be implemented in digital electronic circuits, computer hardware, firmware or software.

BRIEF DESCRIPTION OF THE DRAWINGS

Exemplary embodiments and figures are described in greater detail below, wherein.

DETAILED DESCRIPTION

Figure 1:
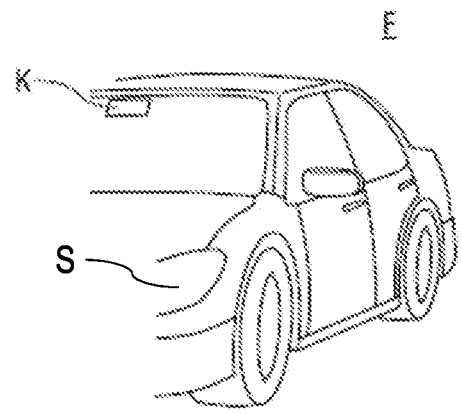
FIG. 1 schematically shows a vehicle having a camera system K and headlights S.

FIG. 1 schematically shows a vehicle F having a camera system K, for example a wide-angle camera which is arranged in the interior of the vehicle behind the windshield, and the environment or the surroundings of the vehicle F is/are captured by the latter. In the dark, the headlights S of the vehicle F illuminate the environment in front of the vehicle which is captured by the camera system K. The intensity of the lighting of the vehicle environment depends on the characteristics of the headlights S. Since the intensity decreases with increasing distance from the headlights (approximately proportionally to the square of the distance), more distant surrounding regions appear darker in the camera image. In particular, the side regions of the vehicle surroundings are not lit by the headlights S as much as the region right in front of the vehicle F. This different lighting can lead to the fact that the images captured by the camera do not contain all the information relevant to the driver, to driver assistance systems or to systems for automated driving. This can lead to dangerous situations when wild animals are crossing at dusk or at night. For this purpose, it would be desirable to have a vision-enhanced image, in which (too) dark image regions experience automatic light amplification.

In one embodiment, the calculation in a system for avoiding accidents involving wild animals is based, for example, on a neural network which, located upstream of a detection or display unit, converts a very dark input image having little contrast and color information or an input image having unbalanced lighting into a representation which is as bright as day.

For this task, the artificial neural network was trained with a data set consisting of "dark and unbalanced, in lighting terms, input images" and the associated "images which are as bright as day". Depending on the type of training, the neural network can ideally simulate methods such as white balancing, gamma correction and histogram equalization, and utilize additional information stored in the network structure in order to automatically supplement missing color or contrast information. The calculated images then serve as an input for displaying, warning about or actively avoiding collisions with animals when wild animals are crossing.

Figure 6:
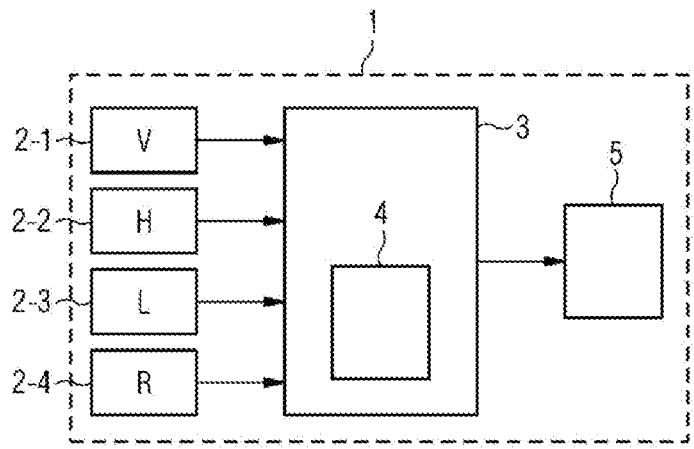
FIG. 6 shows a first schematic representation of a device having a camera system for capturing the panoramic view.

As can be seen in FIG. 6, one embodiment of a device 1 for avoiding accidents caused by wild animals crossing at dusk and at night can have a camera system K having multiple vehicle cameras of a panoramic view system. Multiple units or circuit components can be provided for a conversion of input image data of the multiple vehicle cameras into optimized output image data. In the case of the exemplary embodiment depicted in FIG. 6, the device for adaptive image correction has multiple vehicle cameras 2-$i$ which each produce camera images or video data. In the case of the exemplary embodiment depicted in FIG. 6, the device 1 has four vehicle cameras 2-$i$ for producing camera images. The number of vehicle cameras 2-$i$ can vary for different applications. The device 1 according to the present disclosure has at least two vehicle cameras for producing camera images. The camera images of neighboring vehicle cameras 2-$i$ typically have overlapping image regions.

The device 1 contains a data processing unit 3 which combines the camera images produced by the vehicle cameras 2-$i$ into an overall image. As depicted in FIG. 1, the data processing unit 3 has a system for converting images 4. The system for converting images 4 produces original or output image data (Opti) from the input image data (Ini) of the vehicle cameras (2-$i$), which have an optimized brightness or color distribution. The optimized output image data of the individual vehicle cameras are combined into a composite overall image (in a so-called stitching process). The overall image combined by the image processing unit 3 from the optimized image data (Opti) is subsequently displayed to a user by a display unit 5. By enhancing the vision during the conversion of the image data, the user can recognize wild animals at dusk or at night early on and, as a result, is effectively supported during the avoidance of accidents involving wild animals crossing.

In one possible embodiment, the system for converting images 4 is formed by an independent hardware circuit which carries out the conversion of the brightness or the color distribution. In one alternative embodiment, the system executes program commands when performing a method for converting images.

The data processing unit 3 can have one or more image processing processors, wherein it converts the camera images or video data received by the various vehicle cameras 2-$i$ and subsequently combines them to produce a composite overall image. In one possible embodiment, the system for converting images 4 is formed by a processor provided for this purpose, which carries out the conversion of the brightness or the color distribution parallel to the remaining processor(s) of the data processing unit 3. Thanks to the parallel data processing, the time required for processing the image data is reduced.

Figure 7:
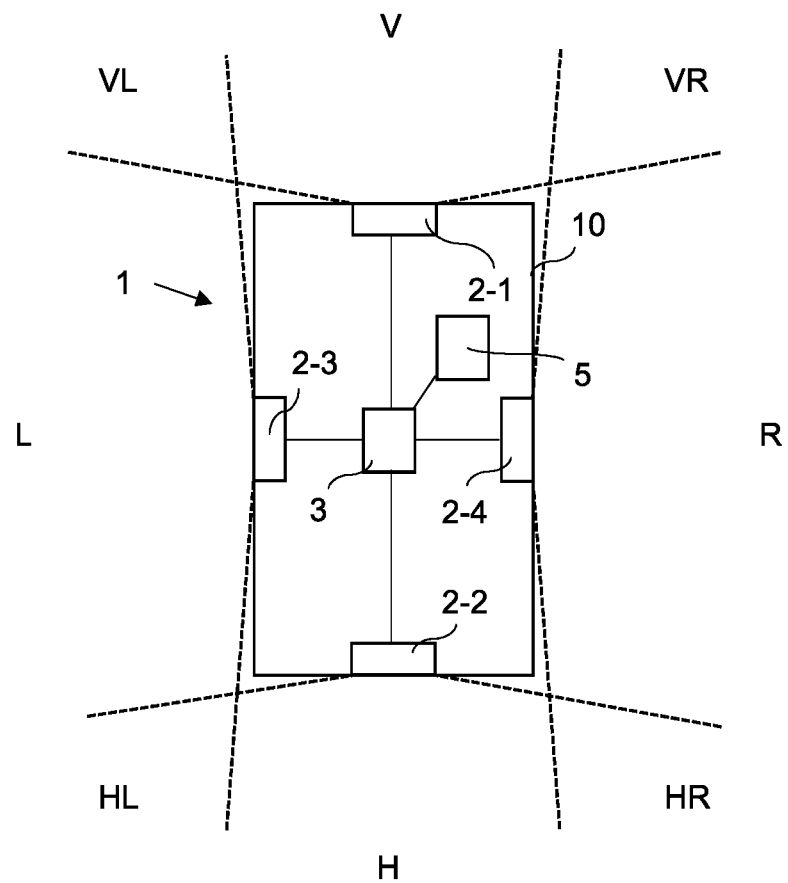
FIG. 7 shows a second schematic representation of a device having a camera system for capturing the panoramic view in a vehicle.

FIG. 7 shows a further schematic representation of a device 1 for avoiding accidents caused by wild animals crossing at dusk and at night in one embodiment. The device 1 depicted in FIG. 7 is deployed in a surround view system of a vehicle 10, in particular of a passenger car or a truck. In this case, the four different vehicle cameras 2-1, 2-2, 2-3, 2-4 of the camera system K can be located on different sides of the vehicle 10 and have corresponding viewing ranges (dashed lines) in front of V, behind H, to the left of L, and to the right of R, the vehicle 10.

For example, the first vehicle camera 2-1 is located on a front side of the vehicle 10, the second vehicle camera 2-2 is located on a rear side of the vehicle 10, the third vehicle camera 2-3 is located on the left side of the vehicle 10 and the fourth vehicle camera 2-4 is located on the right side of the vehicle 10. The camera images of two neighboring vehicle cameras 2-$i$ have overlapping image regions VL, VR, HL, HR. In one possible embodiment, the vehicle cameras 2-$i$ are so-called fisheye cameras which have a viewing angle of at least 185°. The vehicle cameras 2-$i$ can transmit the camera images or camera image frames or video data, in one possible embodiment, via an Ethernet connection to the data processing unit 3. The data processing unit 3 calculates a composite surround-view camera image from the camera images of the vehicle cameras 2-$i$, the surround-view camera image being displayed to the driver and/or a passenger on the display 5 of the vehicle 10.

If the surroundings of the vehicle 10 are dark, the activated headlights illuminate the front region V ahead of the vehicle 10 with white light and relatively high intensity, the taillights illuminate the rear region H behind the vehicle with red light and medium intensity. In contrast, the regions on the left L and right R next to the vehicle 10 are virtually unlit.

In order to recognize wild animals crossing at dusk or at night, the images of a surround-view system can be utilized, on the one hand, in order to recognize wild animals crossing and, on the other hand, the information from different lighting profiles can be calculated to produce an overall image having balanced lighting. As an example, the displaying of the vehicle's surroundings on an indicator unit or a display 5 in the case of an unlit country road is mentioned, where the regions of the front and rear cameras are illuminated by lamps, although the side regions are not brightened by lamps. As a result, a homogeneous representation of the regions having wild animals can be achieved, and a driver can be warned in good time.

In a further embodiment, the system for converting images 4 can be trained with the neural network to the effect that it utilizes information from the better lit regions in order to further enhance the conversion for the unlit regions. Here, the network is then individually trained less with single images for each single camera 2-1, 2-2, 2-3, 2-4, but rather as an overall system including of multiple camera systems.

During simultaneous or joint training of an artificial neural network having dark images (for example, for the side cameras 2-3, 2-4) and bright images (for example, for the front-view cameras 2-1 and rear-view cameras 2-2), the neural network learns optimal parameters.

During the joint training for multiple vehicle cameras 2-i, ground truth data having a brightness and balance applied to all of the target cameras 2-1, 2-2, 2-3, 2-4 are preferably used in a first application. In other words, the ground truth data for all target cameras 2-1, 2-2, 2-3, 2-4 are balanced out in such a way that, for example, no brightness differences can be recognized in the ground truth data in the case of a surround-view application. A neural network CNN1, CNN10, CNN11, CNN12, is trained with these ground truth data as a reference and the input data of the target cameras 2-1, 2-2, 2-3, 2-4, which can have different levels of brightness, in terms of an optimal set of parameters for the network. This dataset can include, for example, of images having white headlight beams and red taillight beams for the front cameras 2-1 and rear cameras 2-2, and dark images for the side cameras 2-3, 2-4. Data having differently illuminated side regions L, R are likewise conceivable, for example if the vehicle 10 is located next to a streetlight, or the vehicle 10 has an additional light source on one side.

In a further application, the neural network for the joint cameras 2-i can be trained to the effect that even in the case of missing training data and ground truth data for one camera, for example a side camera 2-3 or 2-4, the network trains and optimizes the parameters for this camera 2-3 or 2-4 with the missing data based on the training data of the other cameras 2-1, 2-2 and 2-4 or 2-3. This can be achieved, for example, as a restriction (or constraint) in the training of the network, for example as an assumption that the correction and the training must always be the same due to similar lighting conditions of the side cameras 2-3 and 2-4.

In a last example, the neural network utilizes training and ground truth data, which are different in time and correlated with the cameras 2-i, and which were acquired by the various cameras 2-i at different times. To this end, information of features or objects and the ground truth data thereof can be used, which were acquired, for example, at a time t by the front camera 2-1 and at a time t+n by the side cameras 2-3, 2-4. These features or objects and the ground truth data thereof can replace missing information in the training and ground truth data of the other cameras in each case when they are used in the images of the other cameras 2-i and then by the network as training data. In this way, the network can optimize the parameters for all side cameras 2-3, 2-4 and, if necessary, compensate for any missing information in the training data.

When using multiple vehicle cameras 2-i, this leads to an adapted brightness and balance for all of the vehicle cameras 2-i, since the individual lighting profiles in the outdoor space are explicitly captured and trained in the overall network.

In the case of a panoramic view camera system as well, a machine wild animal detection can be carried out on the image data of the camera system K. Depending on the configuration of the detection method, the input image data or the converted optimized output image data can be used to this end.

Figure 2:
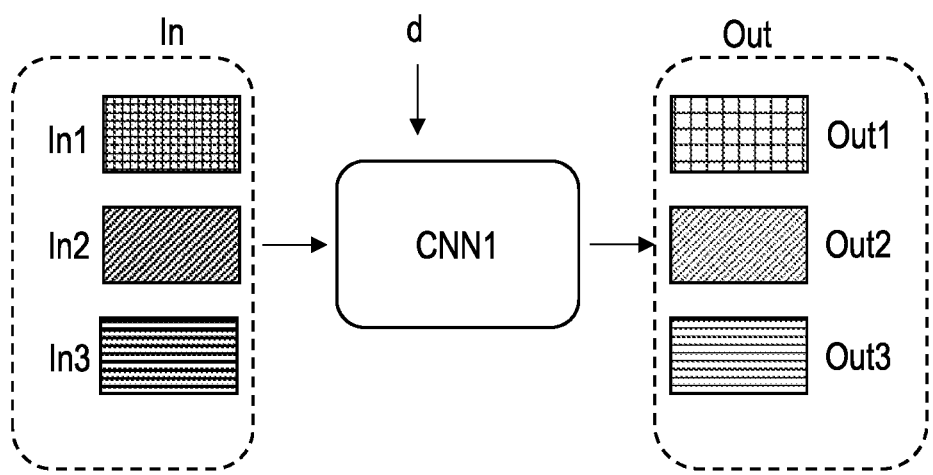
FIG. 2 shows a system for enhancing the vision of camera images.

FIG. 2 schematically shows a general overview of a system for converting images 4 or for enhancing the vision of camera images. An essential component is an artificial neural network CNN1 which learns to assign a set of corresponding vision-enhanced images Out (Out1, Out2, Out3, . . . ) to a set of training images In (In1, In2, In3, . . . ) during a training phase. In this case, assigning means that the neural network CNN1 learns to generate a vision-enhanced image. A training image (In1, In2, In3, . . . ) can contain, e.g., a road scene at dusk, on which only one further vehicle located immediately in front of the vehicle and the sky can be recognized with the human eye. In the corresponding vision-enhanced image (Out1, Out2, Out3, . . . ) the contours of the further vehicle, a sidewalk as a roadway boundary and adjacent buildings can additionally be recognized.

A factor d preferably serves as an additional input variable for the neural network CNN 1. The factor d is a measure of the degree of vision enhancement. During training, the factor d can be established in advance for a pair of images consisting of a training image and a vision-enhanced image (In1, Out1; In2, Out2; In3, Out3; . . . ) and can be provided to the neural network CNN1. During the deployment of the trained neural network CNN1, the specification of a factor d can control how strongly the neural network CNN1 "brightens" or "darkens" an image—the factor d can also be imagined as an external regression parameter (not only light—dark, but with any gradation). Since factor d can be subject to possible fluctuations in the range of +/−10%, this is taken into account during the training. The factor d can fade away by approximately +/−10% during the training (e.g., during the different periods of the training of the neural network) in order to be robust with respect to misestimations of the factor d in the range of approx. +/−10% during the inference in the vehicle. In other words, the necessary accuracy of factor d lies in the range of +/−10%—consequently the neural network CNN1 is robust with respect to deviations from this parameter during estimates.

One possible way of producing the training data (training images (In1, In2, In3, . . . ) and assigned vision-enhanced images (Out1, Out2, Out3, . . . ) includes acquiring image data of a scene having, in each case, a short exposure time and, simultaneously or immediately following one another, a long exposure time. In addition to this, pairs of images (In1, Out1; In2, Out2; In3, Out3; . . . ) having various factors d can be acquired for a scene, in order to thus learn a continuous spectrum for the vision enhancement depending on the parameter or factor d. The camera system K is preferably stationary (motionless) during the production of the training data, compared to the surroundings to be captured. For example, the training data can be captured by means of a camera system K of a stationary vehicle F. The scene captured by the camera system K can, in particular, include static surroundings, that is to say, without moving objects.

If the neural network CNN1 is trained, the vision is enhanced as follows:
Input image→CNN1
Factor d→CNN1
CNN1→vision-enhanced original/output image.

Figure 3:
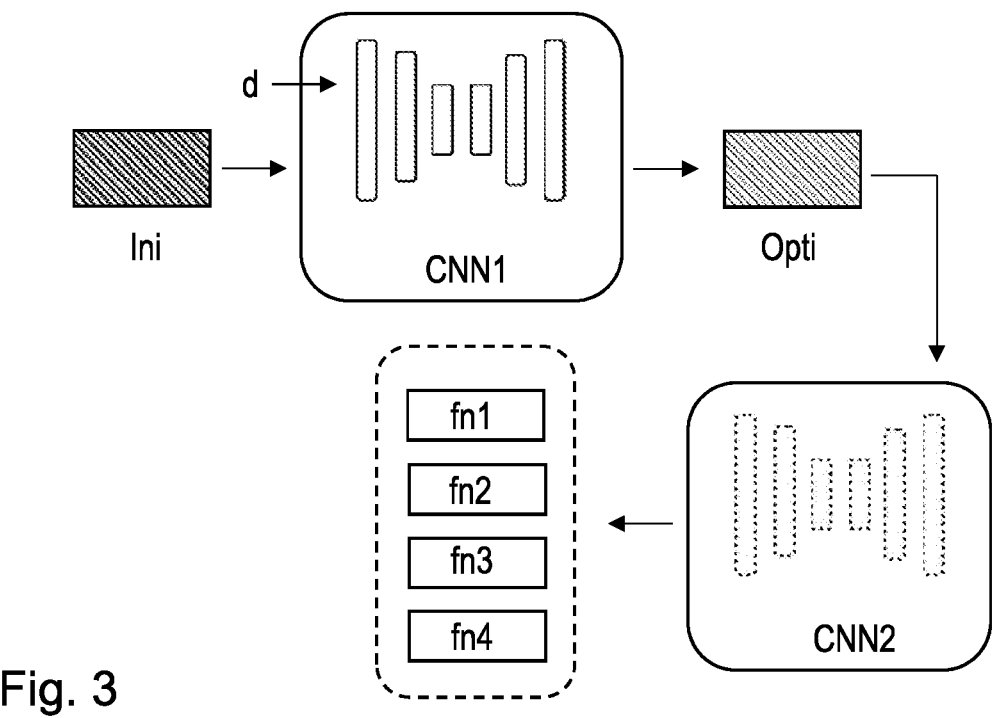
FIG. 3 shows a system having a first neural network for enhancing vision and a downstream, second neural network for detection functions.
Figure 4:
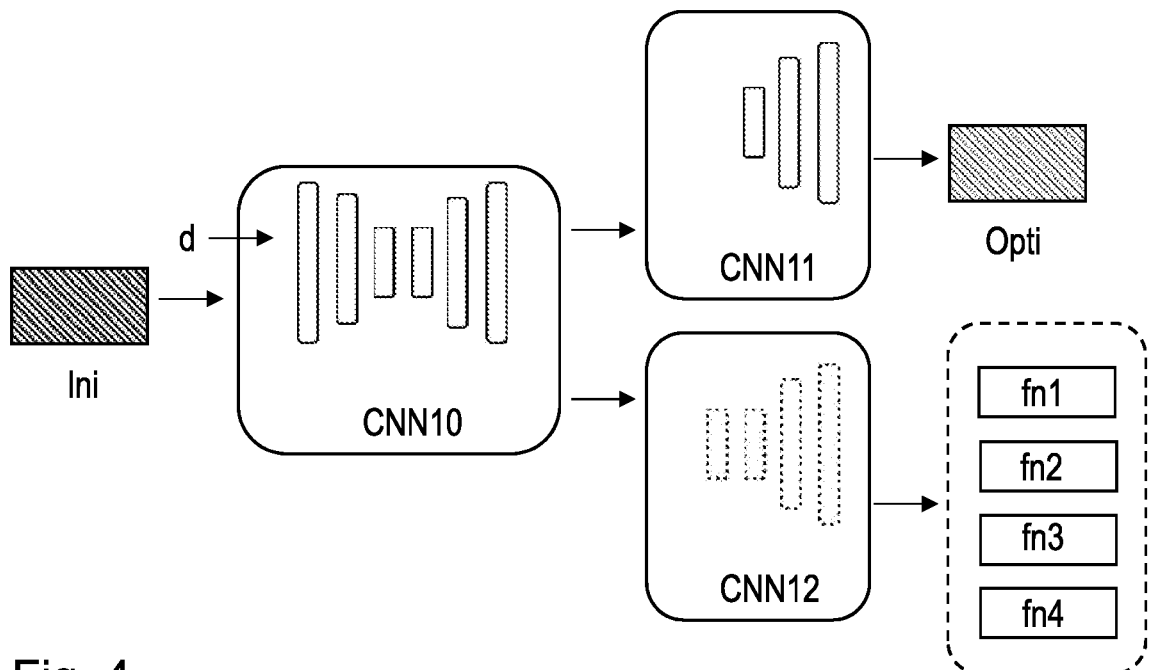
FIG. 4 shows a system having combined vision enhancement and detection functions.
Figure 5:
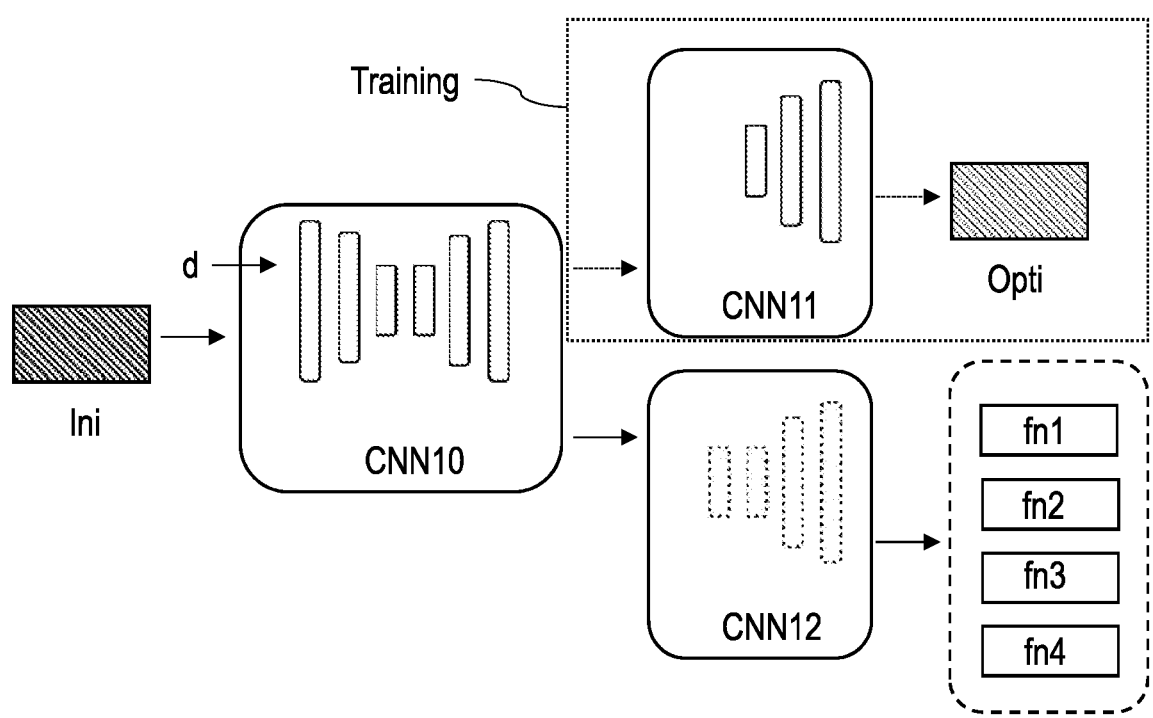
FIG. 5 shows an altered system in which the vision enhancement is only calculated and output as part of the training.

FIGS. 3 to 5 show exemplary embodiments of possible combinations of a first network for vision enhancement having one or more networks of the functions for driver assistance functions and automated driving, ordered according to the consumption of computing resources.

FIG. 3 shows a system having a first neural network CNN1 for vision enhancement having a downstream, second neural network CNN2 for detection functions (fn1, fn2, fn3, fn4). In this case, the detection functions (fn1, fn2, fn3, fn4) are image processing functions which detect objects, structures, properties (generally: features) which are relevant to ADAS or AD functions in the image data. Many such detection functions (fn1, fn2, fn3, fn4) which are based on machine learning have already been developed or are the subject of current development (e.g., object classification, traffic sign classification, semantic segmentation, depth estimation, lane marking recognition and localization). In vision-enhanced images (Opti), detection functions (fn1, fn2, fn3, fn4) of the second neural network CNN2 provide better results than in the original input image data (Ini) in poor visibility conditions. As a result, the detection and classification of wild animals in a region next to the roadway, which is poorly illuminated at dusk or at night, is nevertheless reliably successful early on. In the event that an imminent collision of the vehicle with a deer which is moving into the driving corridor is recognized, the driver can be audibly and visually warned. If the driver does not react, automated emergency braking can take place.

If the two neural networks CNN1 and CNN2 are trained, the course of a method can be as follows:

Input image (Ini), factor d→CNN1→vision-enhanced original/output image (Opti)→CNN2 for detection functions (fn1, fn2, fn3, fn4)→output of the detections: objects such as, e.g., animals, depth, lane, semantics, etc.

FIG. 4 shows a neural network CNN10 for the vision enhancement of an input image (Ini), if necessary controlled by a factor d, which shares feature representation layers (as the input layers or lower layers) with the network for the detection functions (fn1, fn2, fn3, fn4). In the feature representation layers of the neural network CNN10, joint features for the vision enhancement and for the detection functions are learned.

The neural network CNN10 having shared input layers and two separate outputs has a first output CNN 11 for outputting the vision-enhanced original/output image (Opti) as well as a second output CNN 12 for outputting the detections: objects, depth, lane, semantics, etc.

The fact that the feature representation layers are optimized both in terms of the vision enhancement and the detection functions (fn1, fn2, fn3, fn4) during the training means that an optimization of the vision enhancement simultaneously brings about an enhancement in the detection functions. (fn1, fn2, fn3, fn4).

If an output of the vision-enhanced image (Opti) is now not desired or not required, the approach can be further varied, as explained on the basis of FIG. 5.

FIG. 5 shows an approach based on the system of FIG. 4 for neural network-based vision enhancement by optimizing the features. In order to save computing time, the features for the detection functions (fn1, fn2, fn3, fn4) are optimized during the training in terms of vision enhancement and in terms of detection functions (fn1, fn2, fn3, fn4).

No vision-enhanced images (Opti) are calculated during the runtime, i.e., during the deployment of the trained neural network (CNN10, CNN11, CNN12).

Nevertheless, the detection functions (fn1, fn2, fn3, fn4)—as already explained—are enhanced by the joint training of vision enhancement and detection functions, compared to a system having only one neural network (CNN2) for detection functions (fn1, fn2, fn3, fn4), in which only the detection functions (fn1, fn2, fn3, fn4) have also been optimized during the training.

During the training phase, the brightness-enhanced image (Opti) is output by an additional output interface (CNN11) and compared with the ground truth (the corresponding vision-enhanced training image). During the test phase or runtime, this output (CNN11) can continue to be used or, in order to save computing time, can be cut off. The weightings for the detection functions (fn1, fn2, fn3, fn4) are modified during said training with the additional output (CNN11) to the effect that they take into account the brightness enhancements for the detection functions (fn1, fn2, fn3, fn4). The weightings of the detection functions (fn1, fn2, fn3, fn4) consequently implicitly learn the information regarding the brightness enhancement.

In addition to motor vehicles, alternative areas of application are aircraft, buses and trains.

The invention claimed is:

1. A method for avoiding accidents caused by wild animals crossing at dusk and at night, having the following steps:
   a) capturing input image data of a current brightness of a roadway and an adjacent region to a side of the roadway by a vehicle-mounted camera system at dusk or at night,
   b) estimating, by the camera system, a conversion factor based on a current brightness of the input image data;
   c) converting, by a trained artificial neural network, the current brightness and at least one of a color and contrast of the input image data into output image data based on the conversion factor, and
   d) outputting the output image data in a display to a driver of a vehicle as streaming data for avoiding accidents involving wild animals or so that a wild animal is recognizable from the output image data by an image recognition function.

2. The method according to claim 1, wherein the conversion compensates for a lack of sufficient illumination of a region to the side of the roadway and on the roadway.

3. The method according to claim 1 wherein, in step b), the conversion factor is provided to the artificial neural network and, in step c), the conversion is controlled as a function of the conversion factor.

4. The method according to claim 1, wherein the artificial neural network has a joint input interface for two separate output interfaces, wherein the joint input interface has shared feature representation layers, wherein brightness-converted image data are output at the first output interface of the two separate output interfaces, wherein ADAS-relevant detections of at least one ADAS detection function are output at a second output interface of the two separate output interfaces, and wherein, as part of training of the artificial neural network, outputs of both output interfaces are improved.

5. The method according to claim 1, wherein the input image data are captured by the camera system which comprises a wide-angle camera looking parallel to a direction of travel of the vehicle.

6. The method according to claim 1, wherein the input image data are captured by the camera system which comprises a panoramic view camera system having a multiplicity of vehicle cameras.

7. The method according to claim 6, wherein, in step b), the conversion factor is provided to the artificial neural network, in step c), the conversion is controlled as a function of the conversion factor, and wherein a separate conversion factor is estimated or determined for each of the vehicle cameras.

8. The method according to claim 1, wherein the step of outputting the output image data further comprises outputting the converted image data to the image recognition function that includes at least one wild animal detection function which establishes and outputs detected wild animal object information on the basis of the converted image data.

9. A device for avoiding accidents caused by wild animals crossing at dusk and at night, comprising:
- a vehicle-mounted camera system for capturing the surroundings of the vehicle;
- a data processing unit; and
- an output unit,
wherein the camera system is configured for brightness conversion of input image data of the camera system captured at dusk or at night into output image data, the camera system estimates a conversion factor based on a current brightness of the input image data, and has a trained artificial neural network configured to convert the input image data with the current brightness into output image data with different brightness and at least one of different color and contrast based on the conversion factor, the converted output image data being displayed to a driver of a vehicle as streaming data for avoiding accidents involving wild animals or so that a wild animal is recognizable from the output image data by an image recognition function.

10. The device according to claim 9, wherein the camera system comprises a vehicle-mounted wide-angle camera looking parallel to a direction of travel of the vehicle.

11. The device according to claim 9, wherein the camera system comprises a panoramic view camera system having a multiplicity of vehicle cameras.

12. The device according to claim 9, wherein the data processing unit is implemented in a hardware-based image preprocessing stage.

13. The device according to claim 9, wherein the trained artificial neural network for brightness conversion is a component of a vehicle's Advanced Driver Assistance System (ADAS) detection neural network having a shared input interface, and two separate output interfaces, wherein the first output interface is configured to output the converted output image data and the second output interface is configured to output ADAS relevant detections.

14. A non-transitory computer-readable storage medium storing a computer program which, if a data processing unit communicates with the storage medium, the computer program element instructs the data processing unit to perform operations comprising:
- a) capturing input image data of a current brightness of a roadway and an adjacent region to a side of the roadway by a vehicle-mounted camera system at dusk or at night;
- b) estimating, by the camera system, a conversion factor based on a current brightness of the input image data;
- c) converting, by a trained artificial neural network, the current brightness and at least one of a color and contrast of the input image data into output image data based on the conversion factor; and
- d) outputting the output image data in a display to a driver of a vehicle as streaming data for avoiding accidents involving wild animals or so that a wild animal is recognizable from the output image data by an image recognition function.

* * * * *